United States Patent [19]
Cuomo et al.

[11] 3,816,845

[45] June 11, 1974

[54] SINGLE CRYSTAL TUNNEL DEVICES

[75] Inventors: Jerome J. Cuomo, Bronx; Robert B. Laibowitz, Peekskill; Ashok F. Mayadas, Somers; Robert Rosenberg, Peekskill, all of N.Y.

[73] Assignee: International Business Machines Corporation, Armonk, N.Y.

[22] Filed: Sept. 23, 1971

[21] Appl. No.: 183,225

Related U.S. Application Data

[63] Continuation of Ser. No. 875,615, Nov. 12, 1969, abandoned.

[52] U.S. Cl. .......................................357/5, 357/6
[51] Int. Cl. ........................................... H01l 17/00
[58] Field of Search ..................................... 317/234

[56] References Cited

UNITED STATES PATENTS 3,626,391 12/1971 Anacker ......................... 340/173.1

*Primary Examiner*—Rudolph V. Rolinec
*Assistant Examiner*—E. Wojciechowicz
*Attorney, Agent, or Firm*—Jackson E. Stanland

[57] ABSTRACT

A tunneling device, or array of such devices, having at least one electrode which is a single crystal. Tunnel devices having two or more electrodes are shown, as are thin film Josephson devices having two single crystal electrodes. The electrodes of any device can be of the same or different material, and the crystallographic orientations of these electrodes can be the same or different. Although the tunnel barrier is usually an insulator, it can be other materials, or even a vacuum. In a particular embodiment, the barrier is an epitaxial layer. Both in-line and crossed-stripe geometries are used.

14 Claims, 9 Drawing Figures

INVENTORS
JEROME J. CUOMO
ROBERT B. LAIBOWITZ
ASHOK F. MAYADAS
ROBERT ROSENBERG

BY J. E. Stanland
AGENT

SINGLE CRYSTAL TUNNEL DEVICES

This application is a continuation of Ser. No. 875,615, filed Nov. 12, 1969 and now abandoned.

BACKGROUND OF THE INVENTION

1. Summary of the Invention

This invention relates to tunneling devices and more particularly to tunneling devices having single crystal electrodes separated by a tunneling barrier.

2. Description of the Prior Art

Thin film tunneling devices are known and have been discussed widely, for instance, in "The Tunneling Cryotron-A Superconductive Logic Element Based On Electron Tunneling," by J. Matisoo, appearing in *Proceedings of IEEE*, Vol. 55, No. 2, Feb. 1967 at pages 172–180. This same article also describes a Josephson current device which operates on the principle discussed by B. D. Josephson in *Phys. Letters*, Vol. 1, pages 251–253, July 1962 — "Possible New Effects In Superconducting Tunneling."

Conventional thin film tunneling devices have numerous problems associated with them. One of the most troublesome of these results from thermal recycling between a low temperature state and room temperature. This recycling causes stress induced recrystallization and grain growth of electrode material resulting in a whisker growth across the tunnel junction, and thus a short circuit. This problem is especially acute with materials, such as lead, tin, and indium. In general, all low melting point metals exhibit recrystallization when cycled between a superconductive temperature and room temperature. Such cycling of temperature occurs when leads are being deposited on the devices or when there is a leak in the refrigeration system which is used to create an operating environment for the devices. The recycling also occurs when the devices are being stored between usage or are being repaired. In Josephson type devices, where the tunnel barrier is of such small thickness, i.e., 2–20 angstroms, the recrystallization problem becomes extremely sensitive, since arrays of these devices are destroyed if there is even minor recrystallization, i.e., in discrete devices in the array. Due to the thinness of the barrier, shorted junctions easily develop from almost any degree of whisker growth.

Another problem which occurs in presently known tunneling devices is that associated with the device characteristics themselves. For example, in Josephson devices, high maximum current and square loop characteristics (I–V) are required for good switching. In presently known Josephson tunneling devices, these characteristics are severely limited due to the presence of a distribution of superconducting energy gaps, associated with the materials from which the devices are fabricated. In addition, this distribution can cause a spread in the transition temperature.

Still another problem associated with presently known tunnel devices is the limited amount of maximum tunnel current and lack of mechanical stability. Generally, tunnel barrier non-uniformities severely affect the maximum amount of tunneling current, while mechanical stability is directly affected by the strength of the bond between the tunnel barrier and the surrounding electrodes. In presently known tunnel devices, and in particular Josephson tunneling devices, the tunnel barriers are not uniform in thickness and the devices are not mechanically stable.

The presence of impurities is also detrimental to device characteristics. It is well known that impurities tend to segregate along grain boundaries, and that such impurities severely affect switching characteristics of tunnel devices. In addition, growth of good insulators over high impurity concentration areas may be difficult. Therefore, tunnel junctions which include grain boundaries generally do not provide good switching characteristics. In electrodes having grain boundaries in a tunnel barrier, there is a greater possibility of impaired switching characteristics than if grain boundaries were not present in the tunnel of the junction.

The superconducting properties of the grain boundaries are often different from those of the grains. Consequently, if a grain boundary is a portion of the device, the device characteristics can be unsatisfactory.

Generally, once the materials for a tunnel device are chosen, the tunneling characteristics of the device are fixed. The tunneling characteristics are then changed only by a change in the thickness of the tunnel barrier. Therefore, adjustment of these devices to allow optimal switching characteristics is not possible, except by a change in barrier thickness.

Accordingly, it is a primary object of this invention to provide tunneling devices which can be thermally recycled over large temperature ranges without adversely affecting the device switching characteristics.

Another object is to provide tunneling devices having higher maximum current and more desirable switching characteristics.

Still another object is to provide tunneling devices which are easily fabricated and have increased mechanical stability and reproducibility.

A further object is to provide tunneling devices having high and reproducible transition temperatures and controllable switching characteristics.

A still further object is to provide improved thin film tunneling devices having an integral structure without internal grain boundaries.

Applicants have recognized that whisker and hillock growth can be caused by a recrystallization process involving grain boundary diffusion and sliding. Compressive stresses are produced in metal films when such films are cycled through various temperature ranges. Since atoms along grain boundaries can move more easily than those in the lattice, these atoms move to relieve the aforementioned stress. This movement produces whiskers and hillocks. In grain boundary sliding, the entire grain boundary moves, i.e, one grain moves relative to another to relieve stresses. This also can lead to whisker and hillock growth.

Recognizing these mechanisms, applicants have sought to eliminate problems which have severely limited production and use of devices employing tunneling junctions. Specifically, applicants are proposing tunneling devices having single crystal current carrying elements and tunnel barriers in order to eliminate the aforementioned difficulties and to provide numerous other advantages.

It has also been found that the distribution phenomena of the energy gaps of superconducting electrodes of prior art devices is alleviated when single crystal electrodes are used. Therefore, the switching characteristics of devices according to the present invention are sharp and substantially improved. In addition, there is no spread in the superconducting transition temperature of these devices.

Where single crystals are used for electrodes in tunnel devices, problems associated with grain boundaries in the tunneling area are minimized. For example, since impurities tend to segregate at grain boundaries, there is a corresponding smaller possibility of an accumulation of impurities in the tunneling area. This in turn reduces leakage current across a tunneling barrier.

As was mentioned earlier, the I–V switching characteristics of a tunnel device (e.g. Josephson device) are a function of the discreteness of the energy gap of the electrodes. In addition these switching properties depend on the uniformity and purity of the tunneling barrier. When single crystal electrodes are used, the voltage change on switching is greater than when polycrystalline electrodes are used; consequently, the change in state of single crystal tunnel devices is more easily detected than the change in state of polycrystalline tunnel devices.

It has been discovered that the switching properties of tunnel devices also depend on crystallographic orientation. For instance, it has been observed that the magnitude of the energy gap of a superconducting electrode is dependent on crystallographic orientation. In the case of niobium, a film with a [111] axis shows $E_g$=3meV, while a [110] film shows $E_g$=2.7meV. Hence, the switching signal from a tunnel device is optimized by choice of crystal orientation.

Use of the single crystal electrodes allows the deposition of epitaxial barrier layers. These layers are much more uniform in thickness and in impurity content and therefore the tunneling characteristics are substantially improved.

Further, the device characteristics themselves can be changed by changing the orientation of the single crystal films. By proper use of the substrate, the crystal orientation of the electrodes can be adjusted to that orientation which gives the best tunneling characteristics. This is a decided advantage which results from the use of single crystal material for the electrodes of the tunnel device.

Use of single crystal electrodes enables the fabrication of "grain boundary-free" tunneling devices which were not available in the prior art. If the barrier layers are epitaxially grown, then all the electrodes can be single crystals and an entirely boundary-free device is provided. In addition, the adhesion between electrodes and barriers is enhanced and the structure becomes more mechanically stable.

BRIEF SUMMARY OF THE INVENTION

These tunneling devices have single crystal electrodes separated by tunneling barriers. In the preferred embodiment, all the electrodes are single crystals and the barriers are epitaxial layers. The electrodes of a tunnel device need not be of the same material; each electrode of a device could be a different material. This is also true with the various tunnel barriers which are used in a device. Further, the electrodes could be different materials or the same material and the crystallographic structures and/or orientations can be the same or different. The structure of a material is its symmetry, i.e., cubic, hexagonal, etc.

A single crystal is defined in the following way: a material over the tunneling area of which there exists a single crystallographic direction substantially normal to the entire tunneling area. This definition includes directions which deviate from normal to the tunneling area of up to ± 5°.

This invention includes those devices where only part of the total current flowing between the electrodes is caused by tunneling. For example, this could occur when the separation of the electrodes is very large, and tunneling is the mechanism for introducing carriers into the region between the electrodes.

The foregoing and other objects, features and advantages of the invention will be apparent from the following more particular description of the preferred embodiments of the invention as illustrated in the accompanying drawings.

DESCRIPTION OF THE PREFERRED EMBODIMENTS

Figure 1A:
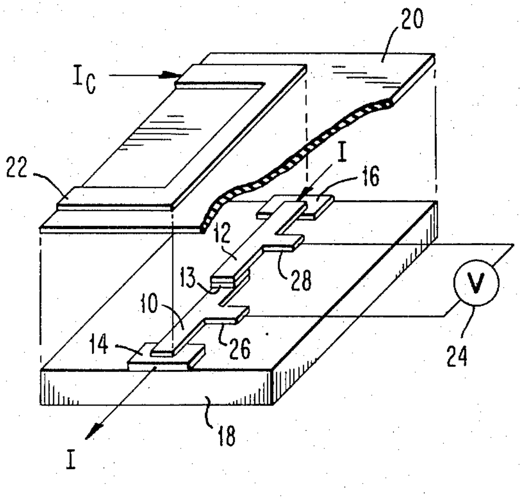
FIG. 1A is an illustration of a tunneling device having an in-line geometry.

FIG. 1A shows a thin film tunneling device having a "in-line" geometry. The device itself comprises two current-carrying layers 10, 12 which are separated by a tunnel barrier 13. Attached to the electrodes 10, 12 are lead connectors 14, 16. The entire tunneling device is mounted on the substrate 18. Insulated by layer 20 from the electrodes 10, 12 and disposed over these electrodes is a control element 22. Although the control element 22 is not required, it is shown as a means by which the switching characteristics of the tunneling junction may be controlled. Current, designated by $I_C$, flows through control element 22 and sets up a magnetic field which affects the switching characteristics of the tunnel junction. Bias means, such as an external current source, is used to provide tunnel current across the tunnel junction. A meter, such as voltmeter 24, can be used to detect voltage changes across the junction. This meter is connected to electrode 10 by contact 26 and to electrode 12 by contact 28.

If desired, the tunneling device of FIG. 1A can be a Josephson gate if the tunnel barrier is made very thin, in the order of 2–50 angstroms. By "barrier," it is to be understood that what is meant is the potential barrier through which charge carriers tunnel. This does not necessarily correspond with the physical thickness of the layer 13. Preferably, for good Josephson device characteristics, the barrier thickness will be not more than 20 angstroms. The electrodes are usually 2,000–20,000A thick, but can be as thin as about 500A. If the electrode films become too thin, the superconducting properties, such as critical temperature $T_c$, are affected, and it is then difficult to make reproducibly good devices. In a Josephson device, both electrodes 10, 12 are superconductors and the electrodes remain in the superconducting state while switching.

The control element 22 can be any superconductor, such as lead. As will be more fully apparent later, the electrodes 10, 12 can be any superconductor material, including compounds and alloys. Presently known Josephson tunneling devices generally use metals such as lead, tin, or indium, for the electrodes and thermally grown oxide layers as the barriers. Materials other than oxides can be used as intermediate layers (tunnel barriers). These include nitrides, sulfides, carbides, etc. Although many materials can be used, it is important that the tunnel barrier be of uniform thickness and be free of defects such as pin holes. Various substrate materials can be used. These include quartz, mica, sapphire, metals, and other suitable materials. For instance a ground plane can be put on the substrate before the devices are fabricated thereon.

What has been described so far also applies to conventional thin film tunneling devices. The novelty of this invention resides in the fact that the electrodes of the tunnel device are single crystal materials and the tunnel barriers are, in a preferred case, epitaxially grown so as to create an entirely boundary-free tunneling junction.

As was mentioned earlier, the fact that single crystal materials are used provides many advantages. The use of single crystals has eliminated the recrystallization problem which presently hinders successful operation of tunneling devices that are cycled over extreme temperature ranges. In addition, use of single crystals and epitaxially grown barriers provides a tunneling device of excellent mechanical stability. Barrier uniformity with respect to thickness and purity is now easily obtainable, which aids in providing increased tunneling current, together with good mechanical stability. Whereas prior tunneling devices have current-versus-voltage characteristics which are smeared, use of single crystal electrodes provides good switching characteristics since only one superconducting energy gap is present in single crystal materials (of the same orientation).

Any suitable method can be used to form the single crystal electrodes. Some of these methods include RF sputtering and DC sputtering, thermal evaporation, and chemical vapor transport. For example, application Ser. No. 837,738, filed June 30, 1969 and assigned to the present assignee, describes a method for sputtering single crystal superconductors. Similarly, any suitable method can be used for epitaxially growing the barrier layers. These methods include thermal oxidation, anodization, ion implantation, sputtering, and evaporation.

Figure 1B:
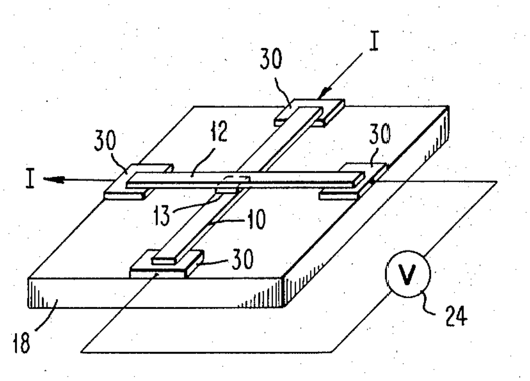
FIG. 1B is an illustration of a tunneling device having a cross-stripe geometry.

FIG. 1B shows a thin film tunneling device according to the present invention, having a cross-stripe geometry. The same reference numerals are used for clarity here as in FIG. 1B. In this geometry, the top electrode 12 is arranged transversely to the direction of the bottom electrode 10. Electrodes 10, 12 are separated by a thin barrier layer 13 as was the case in the device of FIG. 1A. Lead connectors 30 are provided for connecting external leads to the tunneling device. Current I is provided by an external source not shown. Any conventional source is suitable. A meter, such as voltmeter 24, is used to detect voltage changes across the junction, caused by a change in tunnel current across the tunnel junction. The entire tunneling gate is supported by a substrate 18. As is the case with the device of FIG. 1A, the same methods of deposition and the same relative dimensions are present in the device of FIG. 1B. Although no control element is shown, it is to be understood that one could easily be provided in the manner of that of FIG. 1A.

Figure 2:
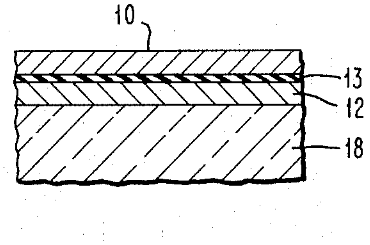
FIG. 2 is a cross sectional view of the tunneling devices of FIGS. 1A and 1B.

FIG. 2 is a cross sectional view of the tunneling junction of the devices shown in FIGS. 1A and 1B. The tunneling junction is comprised of two current carrying electrodes 10, 12 separated by a tunnel barrier 13. Support is provided by the substrate 18. Tunneling current crosses the barrier between the two electrodes. If the barrier is very thin, approximately 2-20 angstroms, and the electrodes are superconductors, Josephson current can flow. For thicker barriers, conventional tunneling will occur.

It is to be understood that any number of tunneling junctions can be provided in a laminate type structure. This will be more apparent in the description of FIG. 6. For now, it is sufficient to state that there can be a series of electrodes separated by tunnel barriers, when more than one tunneling junction is desired.

In FIG. 2, at least one current carrying electrode is a single crystal. Preferably, both metal electrodes are single crystals and the insulating layer is an epitaxially grown layer, reflecting the crystallinity of the underlying electrodes. The crystallographic orientation depends upon the underlying substrate, and various orientations are possible depending on the choice of substrate. This allows a degree of freedom which is not present in conventional tunneling devices. By changing substrate crystallographic orientation, devices can be made to give optimum tunneling characteristics.

Figure 3:
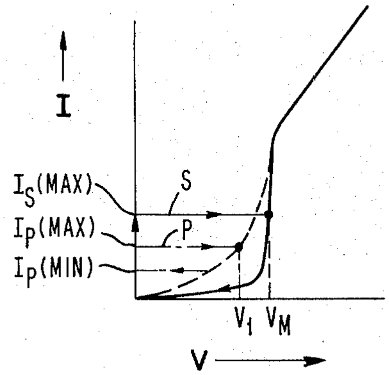
FIG. 3 is a current versus voltage diagram which contrasts a Josephson tunneling device according to the present invention and a prior art Josephson tunneling device.

FIG. 3 is a current versus voltage diagram for the tunneling devices shown in FIGS. 1A, 1B, and 2. In particular, both Josephson current (pair tunneling) and conventional (single particle) tunneling are illustrated here. This diagram illustrates the significantly improved characteristics which result when single crystal materials are used instead of polycrystalline materials.

To aid in understanding the improved characteristics of a Josephson device having single crystal electrodes, a brief explanation will be given of the operating characteristics of a Josephson tunneling device. The Josephson gate comprises two superconducting electrodes separated by a tunneling barrier, and is characterized by having two tunneling states to which the device can be switched. One of these states is a pair tunneling state in which current will flow through the barrier region (Josephson junction) without a voltage drop. The other state is a single particle tunneling state in which current flows with a voltage $E_g/e$ when both superconductors are the same, where $E_g$ is the energy gap of the superconductors and e is the electron charge. The transition from one state to the other can be accomplished by exceeding the critical current for the Josephson junction. This in turn can be brought about by a gate or control pulse of appropriate magnitude.

At no time is there a superconducting-to-normal phase transition in the electrodes of a Josephson device. There is a phase transition in the Josephson device, but it is of a peculiar nature and takes place in a very small volume, i.e., in the barrier. Because the superconducting-to-normal phase transition does not include the relatively large electrodes, which remain superconducting, and because the active region of the device is very small, the transition time to full voltage is very short.

The tunnel barrier in a Josephson device can be a metal, or insulator, or even a vacuum. Two superconductors in close proximity can give rise to Josephson current between them. Even "construction-type" Josephson devices (weak superconducting link) in which a single superconducting sheet has a narrow portion can be used to produce Josephson tunneling current.

In FIG. 3, the curve shown as a dashed line is the usual current voltage characteristic of a prior art superconducting tunnel junction. If there is no Josephson current (zero-voltage current), the I–V curve is that which is represented by a dashed line starting from the origin and proceeding to a voltage $V_1$, after which the solid curve from voltage $V_m$ is followed. If there is Josephson current, then the curves containing a zero-voltage current are applicable.

If the barrier layer is very thin, Josephson current can exist across the junction. This flow of super-current produces no voltage across the junction. That is, there is an initial current increase from zero but no increase in junction voltage. The junction can carry only a limited supercurrent $(I_p)_{max}$ and above this critical current the junction switches abruptly to the usual current-voltage characteristic with a corresponding abrupt increase in voltage across the junction to approximately $V_1$.

The transition from a voltage of approximately $V_1$ to zero voltage for decreasing current occurs at a current that is somewhat less than $(I_p)_{max}$, producing a hysteresis effect. This lower current is designated $(I_p)_{min}$. The direction of the arrows indicates the behavior of the junction when there is Josephson current. That is, at zero voltage there is a current $(I_p)_{max}$ and then the voltage increases to approximately $V_1$ when the critical current is exceeded. The dashed curve is then followed to a certain point, at which the junction switches to Josephson tunneling and the current $(I_p)_{min}$ flows across the junction.

FIG. 3 illustrates the significant improvement which occurs when single crystal electrodes are used in place of polycrystalline material. In this diagram, the solid line (S) represents the curve followed in the operation of a Josephson tunneling device having single crystal electrodes. The dashed line (P) is that corresponding to a Josephson tunneling device having polycrystalline electrodes. As is apparent, the maximum critical current $(I_s)_{max}$ for Josephson tunneling in a device having single crystal electrodes is greater than that, $(I_p)_{max}$, for a Josephson device having polycrystalline electrodes. Further, the hysteresis loop is more square for the single crystal electrode structure than for the polycrystalline electrode structure. In addition, the device returns to a lower zero-voltage current with a single crystal elecrode structure than with the polycrystalline electrode structure, there being a return to the current $(I_p)_{min}$ when polycrystalline materials are used. Thus, much higher $I_{max}/I_{min}$ ratios are obtained with single crystal electrodes.

A major significance in using single crystal material is that there is a single energy gap with single crystal materials and consequently there is no smearing of the I–V switching characteristic due to multiple energy gaps. Because there is no smearing, squarer switching loop characteristics are obtained with greater $(I)_{max}$ and switching voltage $V_m$.

The maximum Josephson current, $I_{max}$, is related to leakage, oxide uniformity, grain boundaries, and the area through which pairs are tunneling. As was mentioned previously, trapped flux occurs around whiskers which grow through the barrier. This trapped flux limits $I_{max}$. These factors also lead to poor I–V characteristics.

The switching voltage $V_m$ is a function of the squareness of the switching loop and depends upon discreteness of energy gap, leakage paths, and orientation of the crystals. If the switching characteristic is very square, then the difference in voltage from one stable state to the other is greater, and the device is better suited for many applications. In operation, two voltage states are detected, i.e., the zero voltage state (at which Josephson current exists) and the voltage $V_m$ (at which single particle tunneling occurs).

Figure 4:
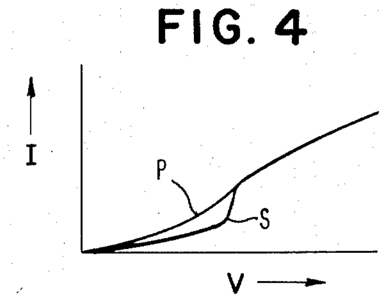
FIG. 4 is a current versus voltage diagram which contrasts a thin film tunneling device according to the present invention with a prior art thin film tunneling device.

FIG. 4 illustrates the significance of the use of single crystals in a tunneling device, having no Josephson current. Here, the thickness of the barrier is greater than that used in a Josephson device so that the pair tunneling characteristic of Josephson current is not present. Similarly with the curves of FIG. 3, it is readily apparent that the use of single crystals as electrode materials provides sharper switching characteristics, with elimination of the more conventional smearing of the characteristic curve which occurs when polycrystalline material is used.

In FIG. 4, the top curve, labeled P, is the normal tunneling characteristic of a tunnel device using polycrystalline materials. The curve labeled S is that for a device using single crystal electrodes. Because the polycrystalline material produces devices having poor tunneling characteristics, device applications are much more feasible with the single crystal tunnel junctions herein proposed.

Figure 5:
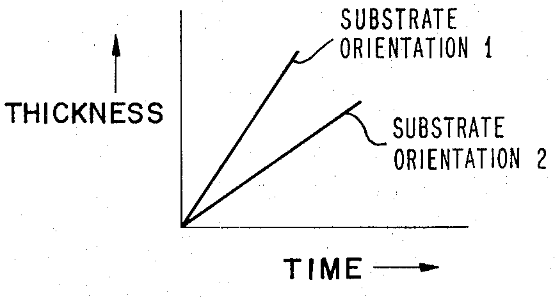
FIG. 5 is a plot of thickness versus time for the growth of tunnel barriers on substrates of different orientations.

FIG. 5 is diagram of the growth of the barrier thickness versus time of deposit. The curves shown correspond to a first crystallographic orientation and a second crystallographic orientation of the substrates. As is apparent from this diagram, the rate of growth of a barrier on orientation 1 is greater than that of a similar barrier on orientation 2. Therefore, when polycrystalline barriers are grown, there will be regions of the barrier, corresponding to orientation 1, which are thicker than other regions corresponding to orientation 2. Although only two curves are shown, it is to be understood that the rate of growth varies depending upon the substrate orientation and that a barrier grown on a polycrystalline substrate will contain many non-uniform thickness areas. Of course, polycrystalline substrates will give rise to insulators with other non-uniformities. Also tunneling current changes exponentially with thickness and therefore the thickness of the barrier is critical. This is particularly true when Josephson tunnel devices are made, since the barrier has to be very thin. Consequently, the growth of barriers having only a single orientation leads to uniform thickness barriers which have more controllable tunneling characteristics.

Figure 6:
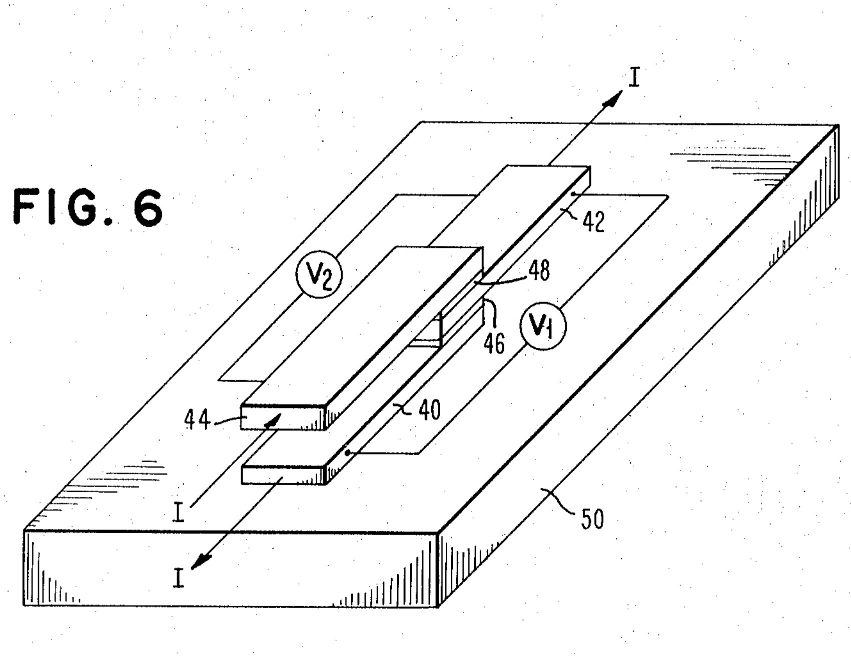
FIG. 6 is an illustration of an in-line tunneling device having more than two electrodes.

FIG. 6 shows a tunneling device having an in-line geometry wherein more than two electrodes are used. Here, three electrodes 40, 42, 44 are shown, although it is to be understood that a number greater than this could be used. The electrodes are separated by tunnel barriers 46, 48 and the entire package is supported by the substrate 50. Bias means in the manner stated with respect to FIG. 1 can be applied between any two electrodes (e.g., triode). In FIG. 6, external bias means (current source) produces current I, which tunnels through the junctions. Voltmeter $V_1$ is used to measure the voltage across junction barrier 46, while meter $V_2$ is used to measure the voltage across barrier 48. While an in-line geometry is illustrated, multiple layer devices can be fabricated in cross-stripe geometry, also.

In the device of FIG. 6, the electrodes are preferably all single crystal, and the barriers preferably are epitaxial depositions which reflect the crystallographic orientation of the underlying material. Again, the particular crystallographic orientation chosen is a function of the substrate material. Various substrates can be used in order to obtain the best tunneling characteristics. The electrodes need not be made of the same material, and need not have the same crystallographic orientation; also, the barriers need not be the same material and need not have the same orientation. The barriers may even be amorphous materials. Although no control element is shown in FIG. 6, it is to be understood that one could easily be provided in the manner of that shown in FIG. 1A.

Figure 7:
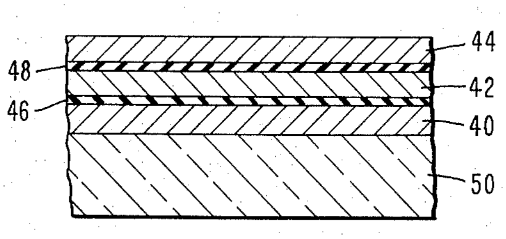
FIG. 7 is a cross section of the tunneling device shown in FIG. 6.

FIG. 7 is a cross sectional view of the tunneling junctions of the device shown in FIG. 6. For ease of understanding, the same reference numerals are used in FIGS. 6 and 7. Here, the various single crystal electrodes 40, 42, 44 are separated by thin tunnel barriers 46, 48. If a Josephson type device is preferred, the barriers are usually 2–50 angstroms in thickness. If a conventional tunneling device is preferred, the barrier thickness can be greater than approximately 50 angstroms, or any other suitable thickness.

Figure 8:
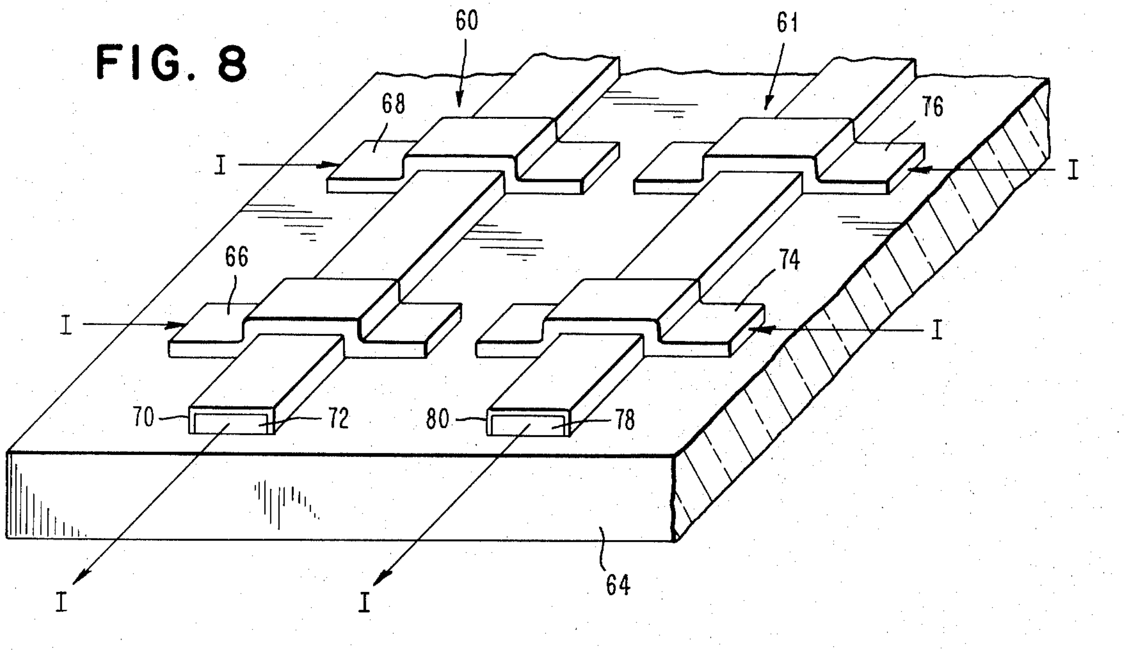
FIG. 8 is an array of tunneling devices, having common single crystal electrodes.

FIG. 8 shows an array of tunneling devices wherein each tunnel device has single crystal electrodes. Also, three dimensional arrays are within the scope of this invention.

Two rows 60, 61 of tunnel devices are shown, each row being supported by substrate 64. In row 60, top electrodes 66, 68 are located over tunneling barrier 70, which in turn is over electrode 72. Tunneling junctions are formed between electrodes 66 and 72 and between electrodes 68 and 72, in the region of their overlap.

Similarly with row 61, electrodes 74, 76 are separated from electrode 78 by barrier 80. Tunneling junctions exist across the barrier 80 in the regions of overlap of the electrodes. In either row, if barriers 70, 80 are made very thin, approximately 2–50A, Josephson current can flow across the junctions. As with the devices previously mentioned, the barriers can be insulators, metals, or even vacuum.

In row 60, electrode 72 is common to all tunnel devices along this row. In row 1, electrode 78 is common to all tunnel devices in that row. Any electrode in either row can be single crystal, and the tunnel barrier can also be a single crystal material.

Although the tunnel devices of the array shown in FIG. 8 are not connected in any particular fashion, they could be connected in order to provide logic, switching, or memory functions. Although only two devices are shown on each line, it is to be understood that any number of devices can be provided. An example of how to arrange Josephson tunnel devices to form a memory is present in U.S. patent application, Ser. No. 744,949, filed July 5, 1968 in the name of the same assignee as the present application now U.S. Pat. No. 3,626,391. It is readily apparent to one of skill in the art that arrays of devices, having common electrodes which may be single crystals, are within the scope of this invention. If desired, the crystallographic orientation of devices in the array can be varied, in order to combine devices having different tunneling characteristics.

In FIG. 8, at least one of the electrodes of each device is a single crystal, while preferably both electrodes are single crystal. If only one electrode is single crystal, it is desirable that this be the bottom electrode. It is most important that the electrode on which the barrier is grown is the single crystal electrode, for reasons of growth uniformity, etc., as mentioned previously.

The orientation of the top electrode will tend to be more clearly that of the bottom electrode even though the barrier layer is an amorphous layer. Although this phenomenon is not completely understood, it has been experimentally observed. This is due to the fact that the barrier is so thin that it "reflects" some of the symmetry of the bottom electrode. That is, it reflects the directionality of the bond angles between the bottom electrode and the barrier itself. This in turn affects the symmetry of the bond angles of the top electrode on the barrier. The switching characteristics of the tunnel device are improved if only the bottom electrode is single crystal, but are improved to a larger extent when both electrodes are single crystals. Of course, it should be recognized that it is more important for the bottom electrode to be single crystal in all of the devices thus far described.

In any of the above described devices, various materials can be used for the electrodes, barriers, and substrates. In addition, these device components can be fabricated in many ways including, but not limited to, sputtering, anodization, evaporation, and thermal oxidation. The following table lists some suitable materials which can be used to fabricate Josephson tunneling devices and other thin film tunneling devices according to the present invention. The materials listed here can be combined in a number of ways to fabricate suitable devices. The table is not meant to be all-inclusive and a person of skill in the art can easily add other suitable materials. For instance, when a superconducting tunneling junction is to be fabricated, almost any superconductive material can be used for the electrodes. The choice of barrier is equally broad. In a Josephson type device, the barriers can be insulators, metals, semiconductors, semimetals, etc., or even a vacuum.

MATERIALS

| Electrodes | Barriers | Substrates |
|---|---|---|
| lead | oxides | sapphire — $Al_2O_3$ |
| tin | nitrides | MgO |
| niobium | sulfides | quartz ($SiO_2$) |
| niobium nitride | carbides | mica |
| niobium-titanium alloy | selenides | alkali halides |
| indium | carbon | metals |
| aluminum | inorganic and organic materials | |

| | |
|---|---|
| vanadium semiconductors | arsenides semiconductors |
| non-superconducting metals | metals (such as copper, gold, silver, etc.) |
| other metals and semimetals | |

While the invention has been described in terms of the preferred embodiments, it should be realized by one of skill in the art that there can be variations in the electrode structure and geometry which are within the scope of this invention. That is, the invention is directed to tunneling devices using single crystal materials as current carrying elements and also as barriers when desired. Use of such materials has overcome many of the very serious problems associated with the fabrication and operation of tunneling devices, and especially Josephson type tunneling devices. Whereas problems such as recrystallization-caused junction shorts are presently impeding the advancement of technology using these devices, the present invention solves this problem, no matter what materials are used. Consequently, the invention has applicability to all presently known tunneling devices, as well as those which may later be fabricated using improved materials.

What is claimed is:

1. A tunnel device, comprising:

first and second superconducting electrodes at least one of which exhibits a single crystalline structure over an area thereof which is defined as a single crystallographic direction substantially normal to said area, said electrodes providing current carriers to said device;

a tunnel barrier located between said electrodes and in contact with said area of said at least one electrode, said barrier having a potential barrier height associated therewith, said current carriers having energies less than said barrier height.

2. The device of claim 1, wherein said tunnel barrier is less than about 60A thick.

3. The device of claim 1, wherein said tunnel barrier is sufficiently thin to support Josephson tunneling current therethrough.

4. The device of claim 1, wherein both said first and second electrodes exhibit said single crystalline structure.

5. The device of claim 4, wherein the crystallographic orientation of each said electrode is the same.

6. The device of claim 1, wherein said electrodes are comprised of the same material.

7. The device of claim 1, wherein said tunnel barrier exhibits said single crystalline structure.

8. The device of claim 1, where said tunnel barrier is an insulator.

9. A tunnel device for current carriers, comprising:

a substrate, a first superconducting layer epitaxially located on said substrate, said layer having an area thereof over which there exists a single crystallographic direction substantially normal to said area, a barrier material layer having a potential barrier associated therewith formed on said first superconductive material, said barrier material layer having a thickness sufficiently thin to support Josephson tunneling currents therethrough, a second superconducting layer located on said barrier material, said current carriers moving between said first and second superconductor layers by tunneling through said barrier material.

10. The device of claim 9, where said first and second superconductive layers are comprised of the same material.

11. The device of claim 9, where the thickness of said barrier material layer is less than 100A.

12. The device of claim 9, where said first superconducting layer, said barrier material layer, and said second superconducting layer are epitaxial layers.

13. The device of claim 9, further including a second barrier material layer located on said second superconducting layer and a third superconducting layer located on said second barrier material layer.

14. The device of claim 9, where said barrier material is an insulator.

* * * * *